United States Patent [19]

Spiegel et al.

[11] Patent Number: 5,652,485
[45] Date of Patent: Jul. 29, 1997

[54] FUZZY LOGIC INTEGRATED ELECTRICAL CONTROL TO IMPROVE VARIABLE SPEED WIND TURBINE EFFICIENCY AND PERFORMANCE

[75] Inventors: Ronald J. Spiegel, Chapel Hill, N.C.; Bimal K. Bose, Knoxville, Tenn.

[73] Assignee: The United States of America as represented by the Administrator of the U.S. Environmental Protection Agency, Washington, D.C.

[21] Appl. No.: 384,055

[22] Filed: Feb. 6, 1995

[51] Int. Cl.$^6$ ............................................. H02P 5/20
[52] U.S. Cl. .................... 318/147; 318/153; 318/157; 318/151; 395/900; 322/17; 322/29; 322/35; 322/44
[58] Field of Search ..................... 318/147, 151, 318/153, 157, 398–815, 113; 395/21, 900, 20; 322/28, 17, 29, 35, 44, 14; 290/55, 44; 388/804

[56] References Cited

U.S. PATENT DOCUMENTS

| | | | |
|---|---|---|---|
| 4,316,096 | 2/1982 | Syverson | 290/44 |
| 4,418,287 | 11/1983 | Syverson | 290/44 |
| 4,698,756 | 10/1987 | Gonzalez et al. | 364/557 |
| 4,903,192 | 2/1990 | Saito et al. | 364/157 |
| 4,906,060 | 3/1990 | Claude | 322/29 |
| 4,994,684 | 2/1991 | Lauw et al. | 290/52 |
| 5,093,892 | 3/1992 | Orii | 388/815 |
| 5,117,083 | 5/1992 | Kawamura | 219/69.16 |
| 5,155,375 | 10/1992 | Holley | 290/44 |
| 5,272,428 | 12/1993 | Spiegel et al. | 318/803 |
| 5,424,948 | 6/1995 | Jordan, Jr. | 395/900 X |

*Primary Examiner*—Karen Masih
*Attorney, Agent, or Firm*—Irving M. Freedman

[57] ABSTRACT

A control system utilizing fuzzy logic adaptive control to control the operation of a wind turbine driven electric power generator to control power generator speed and hence power frequency while maximizing the power output of the power generator. Wind turbulence effects are eliminated and airgap magnetic flux of the power generator is controlled.

21 Claims, 7 Drawing Sheets

FIG_1

FIG_2

FIG_5

FIG_3

FIG_4

FIG_7A

FIG_7B

FIG_7C

FUZZY LOGIC INTEGRATED ELECTRICAL CONTROL TO IMPROVE VARIABLE SPEED WIND TURBINE EFFICIENCY AND PERFORMANCE

BACKGROUND OF THE INVENTION

The present invention relates to the use of fuzzy logic based integrated intelligent control of a wind turbine electrical generation system to improve its efficiency and performance. Wind-generated electricity in regions with good resources could have a profound impact on energy production industries in the U.S. and around the world.

It has been conservatively estimated that the U.S. accessible wind resource could produce more than 10 times the electricity currently consumed. For example, the Bonneville Power Administration has identified 20 to 60 gigawatts of potential wind capacity in eastern Idaho and Montana, alone. Wind energy is the most cost-competitive renewable energy technology for the bulk power market. It is estimated that over 60 billion kWh per year of electricity will be produced by wind energy by the year 2000. Thus, every 1% improvement in wind turbine generator efficiency will create a significant amount of energy production. Improvements of as high as 15-20%, which are possible with the present invention, are thus extremely desirable. Since fossil fuels are the primary energy source for the production of electricity in the U.S. and worldwide, a reduction in power production from these sources can result in a concomitant reduction of emissions of gases and pollutants which are considered to be acid rain precursors and contributors to the greenhouse effect (global warming). The pollutants include $SO_2$ and $CO_2$. The potential for enhanced environmental quality is realized because energy produced by environmentally clean wind turbines would be used to off-set energy produced by fossil fuels such as coal. Increasing the energy capture of wind turbines would also result in the reduction in the cost of wind produced electricity. Cheaper energy would enhance economic productivity, international competitiveness of U.S. industry, and cost savings from reduced energy bills. Wind energy production would also reduce the U.S. dependency on energy imports, particularly oil, as non-renewable resource, and improve national security.

The general components of wind turbines have changed little over the years. A rotor, rotatably supported by a tower, generates aerodynamic forces to turn a main shaft. Gears in the power train drive the generator at a given speed. Mechanical controls are provided to adjust the rotor speed in high winds and to keep the rotor facing into the wind. In the quest for higher rotor speeds, reduced blade area, and lower cost, new wind turbines are designed with flexible, lightweight blades, teetering blade-to-hub attachments, improved ailerons, tip brakes, increased tower heights, aerodynamic tower shapes, variable-speed rotors, and direct-drive transmissions. The new variable-speed wind turbine design allows turbines to more efficiently produce electricity at lower and fast-changing wind speeds. Virtually all existing turbines produce electricity at constant revolutions per minute (rpm) in order to produce 60 Hz ac power. Constant-speed turbines require heavier designs than variable-speed systems because the increase in torque produced by wind gusts must be absorbed by the drivetrain. Newer variable-speed turbines, in which a variable speed drive is provided to accommodate changes in rotor speed due to changes in wind speed and direction while maintaining a constant voltage, constant frequency (60 Hz) output, provide the need for advanced electronic controls with adaptive control capability. Current designs include the use of power electronics (solid-state adjustable speed drive or converter) which allows the speed of the rotor to vary with wind speed while maintaining constant frequency power output. The use of converter technology has improved the total energy capture of the variable speed wind turbine system.

However, such converter systems, while improving the performance and efficiency of wind turbines, do not necessarily operate the turbine for maximum power output. To generate the maximum power output at each varying wind speed is difficult to accomplish. One reason that conventional controllers associated with the variable-speed converter systems do not necessarily optimize power output considerations is the control complexity of meeting all of the potential contradictory demands placed upon, and the large number of variables occurring within, such a system, including, for example, variations in the wind speed and acceleration, wind gusts and wind turbulence. Conventional variable-speed control systems can generate electrical power at a constant frequency in the face of such a plurality of variables, but not in the most efficient manner to produce maximum power output.

Moreover, it is desirable to be able to readily modify or retrofit existing variable speed wind turbine systems with an advanced electronic control system to provide, or improve, power output efficiency.

The present invention utilizes fuzzy logic set theory in an integrated intelligent controller to improve the output power and performance of variable speed wind turbine systems. The aerodynamic efficiency of turbines for varying wind velocity can be maximized by setting the optimum tip speed ratio (ratio of the turbine speed at the blade tip to the free stream wind speed). A typical family of turbine torque-speed curves for varying wind speeds reveals, that for each particular wind speed, there exists a turbine speed to deliver maximum power output. To generate this maximum power at each wind speed, the generator load torque must be matched with the turbine torque. This requires a controller that can vary the turbine speed to get the maximum power output at the given wind conditions. The turbine generator torque is proportional to the square of the rotor speed, while the power output is proportional to the cube of the rotor speed, such that the generator output power is proportional to product of torque and speed. Where constant power hyperbolic curves intersect (at a constant wind speed) the turbine torque/speed curves yields the maximum producible power output by the turbine. When this is plotted, it is to be noted that this value does not occur at the peak of the turbine torque/speed profile.

Because of variable wind speed conditions, including gusts, the turbine generator will be rarely operated at full (rated) load conditions. This means that at any reduced speed, light load steady state condition, the generator efficiency can be further improved by reduction of the generator airgap magnetic flux. At light load conditions, rated flux operation yields excessive core loss and, consequently, low efficiency of operation. The concurrent reduction of flux and increase of active current, so that the developed torque matches the load torque, can provide improved turbine generator efficiency. Thus, once the turbine speed and the developed torque are both set to optimum values, the generator flux component of current can be decreased to reduce the airgap flux until the generator produces the maximum output power.

Fuzzy logic control has been shown to be a promising a technique for extracting maximum performance from modern AC induction motors when the motors are operated at less than rated speeds and loads as set forth in U.S. Pat. No. 5,272,428 of Ronald J. Spiegel and P. Jeffery Chappel, assigned to the same assignee as the present invention and hereby incorporated by reference. Fuzzy logic control has the ability to represent complex systems, such as the wind turbine.

There is, therefore, a need to improve the efficiency of wind turbine systems to increase energy production and hence lower electricity production costs. It is important that the control system to accomplish these objects be relatively inexpensive and capable of addition to existing wind turbine systems through retrofitting, as well as incorporation into the design of new turbine systems.

OBJECTS AND SUMMARY OF INVENTION

It is accordingly an object of the present invention to provide an improved arrangement for increasing the electric power output of variable speed wind turbines while maintaining constant power frequency.

It is a further object of the present invention to improve the efficiency and performance of wind turbines and systems, including wind turbines which include an electronic converter system to allow variable speed power production.

It is a still further object of the present invention to provide an improved adaptive electric controller which is uncomplex, relatively inexpensive and may readily be retrofitted, or integrated into, exiting wind turbine control systems in order to improve the efficiency and performance of the existing wind turbine control systems.

It is yet another object of the present invention to provide an improved control system for a wind driven turbine generator which is competitive with fossil fuel electrical generating systems in order to reduce the emissions of carbon dioxide, sulfur dioxide and nitrogen oxides which are precursors to acid rain.

It is still another object of the present invention to provide an improved control system for a wind driven turbine which utilizes fuzzy logic set theory to enhance energy generation and maximize power output.

In carrying out the present invention, a fuzzy logic-based controller is applied to a variable speed wind turbine system as an additional input(s) to the converter in order to maximize the power output of the system in the presence of variable winds. More particularly, the fuzzy logic controller develops control signals to: (1) optimize turbine speed so that the aerodynamic efficiency is maximized; (2) reduce generator airgap magnetic flux until the output power is further maximized; and (3) provide torque speed control and eliminate the pulsating torque effect due to wind turbulence.

Figure 1:
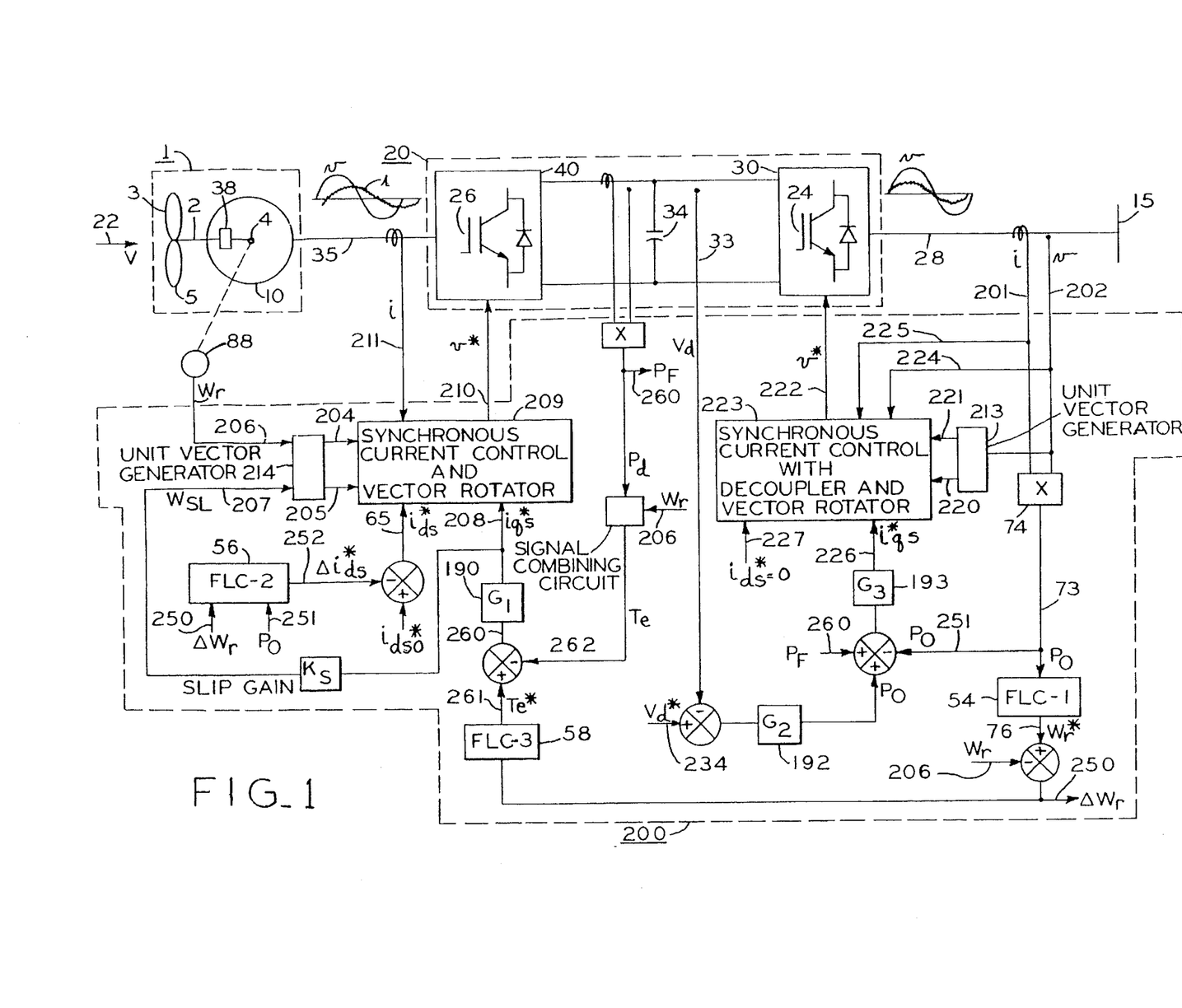
FIG. 1 is a general block diagram of a wind turbine electrical control system incorporating the present invention.

Referring first to FIG. 1. Electric power generator 10, which may be a squirrel cage induction or a wound-field synchronous generator, is connected through mechanical coupling 2 to rotor 4. The electrical output 35 of generator 10 is connected to converter 20. Output 28 of converter 20 is connected to utility grid load 15. Wind indicated by arrow 22 generates aerodynamic forces on rotor 4 blades 3 and 5 causing shaft or mechanical coupling 2 to rotate. Rotating generator 10 at the proper speed produces 60 Hz output power to power grid 15. Traditionally, constant speed gear drives (not shown) in the power train of mechanical coupling 2 allow the shaft to turn at the desired speed. Newer designs, utilize electric converter technology to couple the generator directly to the turbine without gears. This type of design is called variable speed wind turbine (hereinafter "VSWT"). Variable speed drive 20 (hereinafter "VSD") includes semiconductor power devices such as 24 and 26 and are generally referred to as converters and which may include Hanning PWM (pulse width modulated) semiconductor integrated circuits or chips. Converter 20 converts variable voltage, variable frequency input power 35 to single voltage, single frequency output (60 Hz) 28. Power converter 20 includes rectifier 40, a capacitor or DC link 34, and a pulse with modulated inverter 30. Rectifier 40 converts variable frequency AC power to DC. Filter capacitor 34 maintains smooth DC link voltage 33 and decouples inverter 30 output (60 Hz AC) from the variable frequency AC input 35. VSDs provide wind turbine 1 start up capability, better quality output power 28 (less ripple in the waveform), increased energy capture, no gear box, and regenerative braking capability.

The aim of the adaptive control system is to improve the power output of the VSWT. To achieve this goal the control system addresses three key problems. First, the VSWT extracts the maximum power particularly in medium-to-brisk winds. If rotor 4 slows wind 22 excessively, too much wind will flow around rotor blades 3 and 5; if rotor does not slow the wind enough, too much energy will pass through unused. An optimum is achieved when the wind is slowed by approximately two-thirds, resulting in a theoretical power coefficient (ratio of power extracted from the wind to the power available in it over the area covered by the diameter of the rotor) of 0.593. Also, generator 10 efficiency is improved by reduction of the magnetic field airgap flux of the generator to lower generator iron core loss. In addition, adaptive speed control is provided to eliminate pulsating torque due to wind turbulence and steady-state harmonic torque generated by the turbine.

Figure 2:
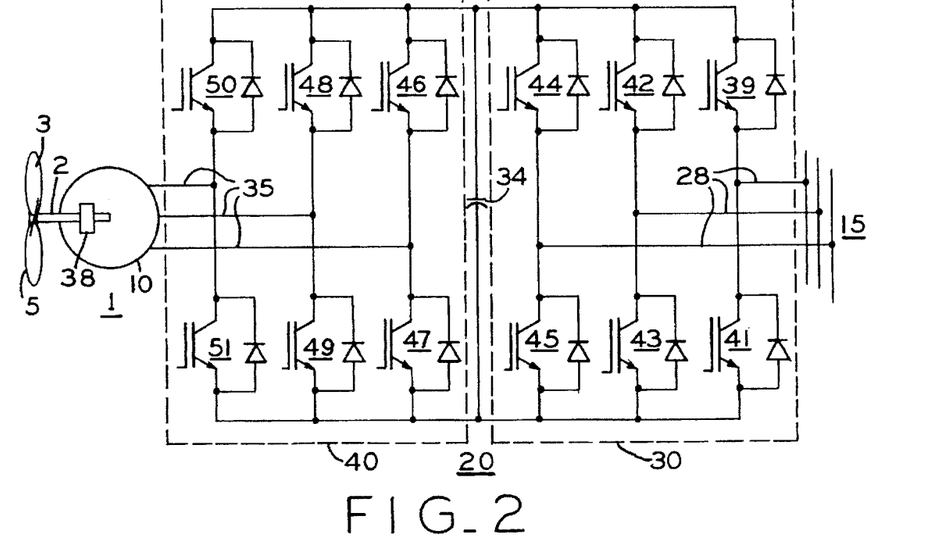
FIG. 2 is a block diagram showing details of the convertor portion of FIG. 1 converter of FIG. 1.

FIG. 2 shows the details of the generator/converter (VSD) system of FIG. 1. Referring to FIG. 2, wind turbine rotor shaft 2 is coupled to a squirrel cage induction generator 10 through a speed-up gear ratio gearing 38. Induction generator 10 is electrically connected to a voltage-fed pulse width modulated (PWM) insulated gate bipolar transistor (IGBT) rectifier 40. A Hanning PWM chip is used in both rectifier 40 and inverter 30 sections for voltage vector rotation and sinusoidal PWM generation. The IGBT PWM inverter 30 is connected to the utility grid power lines 15. Squirrel cage induction generator 10 is rugged, reliable, and economical. Active power can flow in either direction (rectifier-to-inverter or inverter-to-rectifier) as required by the converter control sequence. Advantages of this converter include a grid-side power factor which is unity with harmonic distortion essentially nonexistent which is a recent requirement of IEEE Standard 519/IEC Standard 555. In addition, generator 10 current 35 is practically sinusoidal and the rectifiers can produce the lagging VAR requirement of the generator. Additional advantages include possible continuous power production from nearly zero speed to the highest possible safe speed; the turbine, if it is of the vertical type, allows the generator to be operated as a motor to provide starting torque; regenerative braking torque is used to stop the turbine; the generator airgap flux is controlled for improvement of efficiency; the transient response is fast, giving improved system performance; and the multiple generator/converter elements can be operated in parallel for high power generating systems as shown in FIG. 2. Parallel semiconductor elements 39; 41; 42, 43; and 44, 45 are part of PWM inverter 30 in FIG. 2 while parallel elements 46, 47; 48, 49 and 50, 51 are part of PWM rectifier 40.

FIG. 1 also shows a flow diagram of fuzzy logic-based control system 200 which is applicable for either a horizontal or vertical axis wind turbine 1. Conventional symbols and notations are used whenever possible to define the parameters and functional blocks associated with the control scheme. The superscript star (*) is used to designate control variables. The elements 190, 192, and 193 labeled $G_1$, $G_2$, and $G_3$, respectively, are gain or compensator functions and may contain a limiter to restrict the excursion of the respective variable. The objective of the control approach is to enhance the performance of the VSWT by maximizing the output power for a given wind speed 22. This is accomplished by three fuzzy logic controllers, 54, 56 and 58 labeled FLC-1, FLC-2, and FLC-3, respectively, which perform distinct but coordinated tasks. With this control arrangement, a typical 15–20 percent output power gain is possible. The digital signal processor control system is based on the integrated circuit elements sold by Texas Instruments as their model DSP TMS320630

The operation sequence of FIGS. 1 and 2 can be explained with reference to FIGS. 3 and 4 and is as follows: to start up, generator 10 acts as a motor supplied by power lines 15 and operated at rated magnetic flux. This feature is especially attractive for vertical axis wind turbines which require starting torque. Above a threshold speed the generation mode is invoked to produce output power on power lines 15; FLC-3 (58) provides speed control; FLC-1 (54) provides output power maximization control; and FLC-2 (56) provides generator efficiency optimization (airgap flux control). To shut the system down, generator 10 is operated at rated flux in the regeneration braking mode. For wind velocity changes, rated flux is established and the control sequence repeated for the fuzzy logic controllers once steady state conditions are established.

The variable voltage, variable frequency output 35 of generator 10 is converted to single voltage, single frequency (60 Hz) 28 by power converter 20 and fuzzy logic-based intelligent control system 200 (See FIG. 1). As demonstrated by the voltage and current waveforms on FIG. 1, inverter 30 output maintains unity power factor, that is, the voltage 202 and current 201 are in phase. The double PWM converter 30, 40 allows power flow in either direction so that during the generation mode, power flows from generator 10 to the utility bus power lines 15, but during motoring operation the inverters reverse their roles allowing power to flow from the power lines to generator 10.

Vector-type control is used in the converter 30, 40 which allows an AC induction motor, such as 10, to be controlled like a separately excited DC motor. Very fast and precise responses of an induction motor to input signal changes are thereby possible with this control procedure. With vector control, the generator 10 torque and rotor flux is independently controlled by the q and d-axis components of the stator current ($I_{qs}$ and $I_{ds}$, respectively. Rectifier 40-has indirect vector control and unit vector signals 204 and 205 from unit vector generator 214 for the vector rotation operations inside the synchronous current control operation circuit 209 are derived from feedback turbine speed signal 206 generated by tachometer 88 in response to turbine speed and feedforward slip frequency signal 207. Torque current 208 and excitation current 65 command signals are derived from the outputs of the fuzzy logic controllers (FLC-3) 58 and (FLC-2) 56, respectively.

Figure 3:
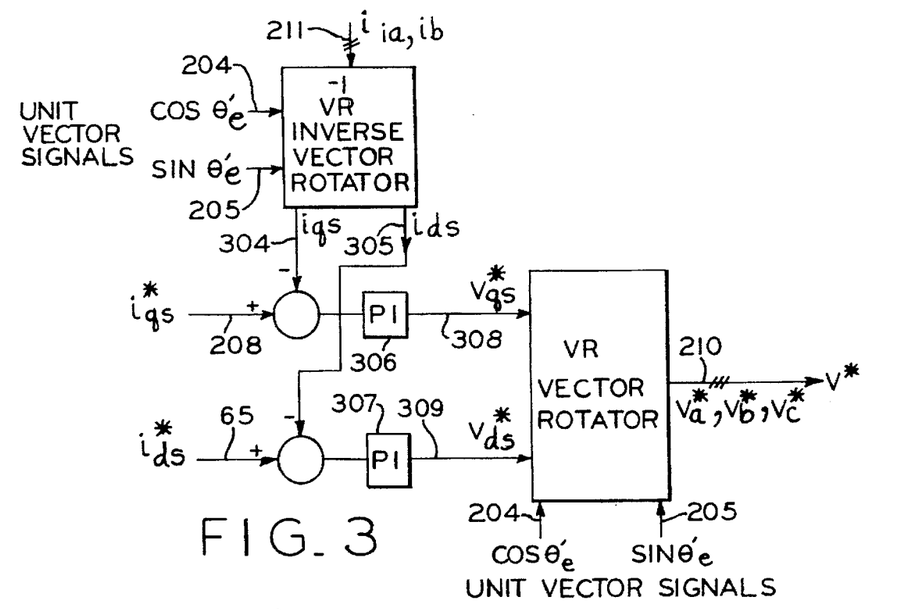
FIG. 3 is a block diagram of the synchronous current control and vector rotator of FIG. 1.
Figure 4:
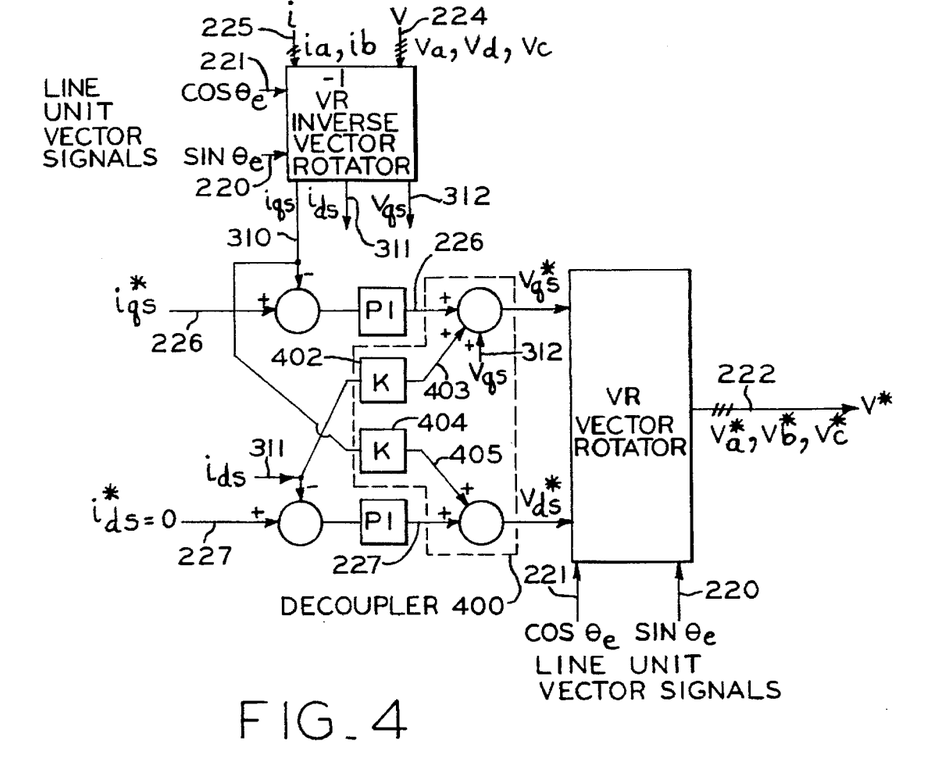
FIG. 4 is a block diagram of the synchronous current control with decoupler and vector rotator of FIG. 1.

The synchonous current control and vector rotation operations 209 are depicted in FIG. 3. These operations basically change current control to voltage control within the current loop. This provides the sinusoidal modulating voltage signal 210 for the Hanning PWM semiconductor circuit embedded in rectifier 40. Instantaneous phase currents 211, after conversion to quadature currents 304 and 305, are compared with instantaneous current commands 65 and 208 and the errors through PI compensators 306 and 307 to generate the quadrature voltage signals 308 and 309. The PWM inverter 30 uses direct vector control; vector signals 220 and 221 derived from the line voltage waveform signal 202 by unit vector generator 213. As with the rectifier, the input control or modulating signal 222 to the Hanning PWM semiconductor circuit of inverter 30 is a sinusoidal modulating voltage. DC voltage control signal 234 is provided in the outer loop with the output power 251 control in the inner loop. This provides control for the line active current 226 and reactive current 227 signals. All the feedback signals are determined from the line signals 201 and 202. Feedforward power 260 is for fast response so that DC link voltage 33 does not collapse. The synchronous current control, decoupler, and vector rotation operations 223 are shown in detail in FIG. 4. The decoupler 400 is for fast response. Line series inductance (L) creates a cross coupling effect. When the current on line 226 is changed it creates a voltage drop on line 227, or when the current on line 227 is changed a voltage drop is produced on line 226. This cross coupling effect slows down the response of the inverter to establish the active current ($I_{qs}$). The coupling effect can be cancelled by the feedforward term (K=WL) 402 in line 403 and by the term 404 in line 405. The additional feedforward EMF 312 on line 226 cancels the counter EMF effect. The other line 227 does not need this compensation. The DC link voltage ($V_d$) at capacitor 34 is controlled at a desired level to permit PWM operation of the converter on both sides (rectifier 40 and inverter 30). The level, if too high, could damage the semiconductor power devices 24 and 26. If the voltage is too low, PWM operation may be prevented. Energy from line 35 from turbine 1 will boost $V_d$, and energy outflow to the line 28 will decrease $V_d$. The DC link voltage level is thus controlled by the output power ($P_o$) in much the same manner as the water level in a tank with input and output pipes.

Generator 10 torque produced by a wind generation system 1 is proportional to the square of the rotor speed and, correspondingly, the output power is proportional to the cube of the rotor speed. For a given wind 22 speed, generator 10 torque is small for slow rotational speeds. As the rotational speed increases, the torque increases to a maximum value and then decreases for further speed increases. A family of such curves can be produced for different wind speeds. To achieve the optimal aerodynamic efficiency, or maximum generator output power, the generator load torque is matched to the turbine torque. However, at this optimum operating point, the turbine torque is not necessarily at the maximum value. Fuzzy controller FLC-1 (54) uses the measured system output power (P$_o$) 73 in conjunction with a fast, real time search of the shaft 2 speed such that the output power is maximized for a given wind velocity. The turbine speed is adaptively varied by changing the generator load torque. This real time search method is parameter independent and fast convergence is obtained by adaptive step size control using fuzzy logic principals.

Fuzzy logic controller FLC-2 (56) operates sequentially after completion of the FLC-1 (54) operation. FLC-2 (56) detects steady state operation of the speed loop and then decrements the flux component of the stator current, I$_{ds}$, until the output power is further maximized. Because the wind turbine 1 generally runs at a reduced speed (below the rated speed of generator 10), a light load condition exists at steady state conditions so that the generator/converter 10/20 efficiency can be improved by reduction of the generator 10 airgap flux, and thereby trade-off core loss with copper loss. Substantial enhancement of the output power can be achieved through optimal control of the flux level in generator 10, but the on-line implementation is difficult. The relation between control variables such as stator voltage, stator frequency, stator current, or rotor frequency, and the output quantities such as shaft speed or torque, which maximizes efficiency is a complex function of generator parameters and is heavily influenced by nonlinear effects, such as saturation, and an increase in the rotor resistance due to a temperature rise. Fuzzy logic control is based upon the adaptive adjustment of the airgap flux level; does not require knowledge of either the generator or inverter parameters; and is insensitive to parameter variations such as rotor resistance changes. The fuzzy logic-based search procedure of fuzzy logic controller 56 begins by decreasing the flux below the rated value by adjusting the flux component of stator current 65. At each step output power 251 is measured. Once the controller decreases the flux beyond the optimal value, a decrease in output power 251 (P$_o$) will be detected. The next step in the search is then taken in the opposite direction. Once this optimum point is reached, fuzzy logic controller 56 will continue to make small adjustments in the power generator 10 flux in response to any shifts in the optimal point caused by temperature effects. It is possible to adjust the power generator 10 rotor flux while regulating the speed or torque. However, the decoupling between the flux and torque components of the stator current is not complete so that changes in the flux will produce some disturbances (pulsations) in the torque. The torque loop compensates this pulsating torque due to fuzzy logic controller 56 FLC-2 operation. Error signal 260, which is comprised of the differences between the torque command signal 261 and feedback torque signal 262, which is produced by combining power signal Pd and speed signal Wr in a signal combining circuit provides the compensation.

FLC-3 (58) is a fuzzy logic-based adaptive speed loop controller which provides robust speed control. The attenuation of wind turbulence effects and oscillatory torque on the turbine is provided by the torque loop feedback signal 262. Control is applied to the torque producing component of the stator current 208 (I$_{qs}$) to maintain the speed at the required value. Additionally, the drive system 20 maintains satisfactory dynamic performance even when generator 10 operates at reduced flux to optimize efficiency.

The underlying principle for the fuzzy logic controllers FLC-1 and FLC-2 are essentially the same, except that the control variables are different. Therefore, only a general controller will be described and it will be understood that the last control increment, LΔ, and the present control increment, Δ, represent the excitation current 65, I*$_{ds}$, for FLC-2 (56) and the rotor speed, w*$_r$(76) for FLC-1 (54). The control block diagram that explains the output power maximization 54 (FLC-1) and the generator 10 flux efficiency optimization 56 (FLC-2) is shown in FIG. 5.

Figure 5:
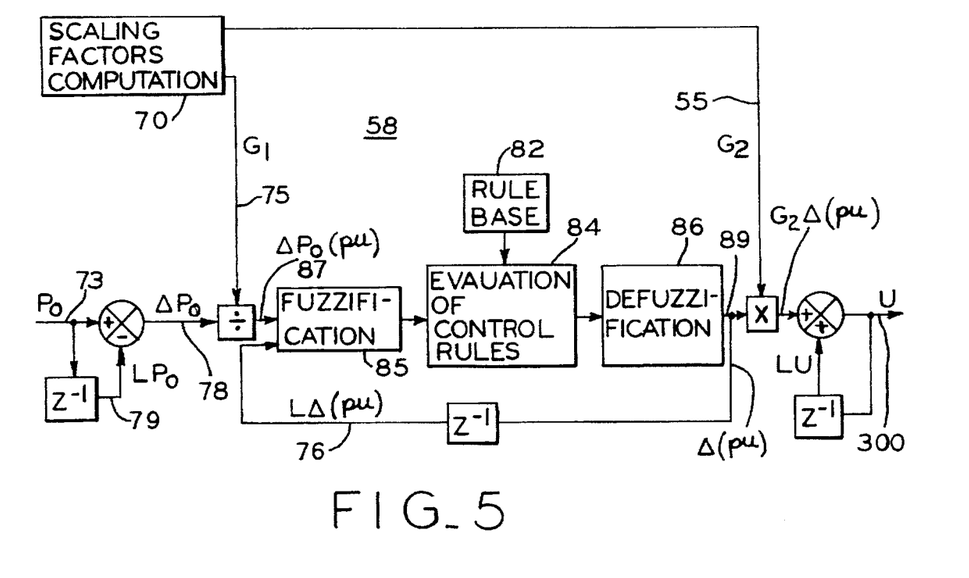
FIG. 5 shows details of the control block diagram for either output power maximizaton (FLC-1) or flux efficiency optimization (FLC-2).

Referring to FIG. 5, output power 73 is first sampled by power transducer 74 (see FIG. 1) and compared with the previous value 79 to determine the power increment (ΔP$_o$) 78. The last or old control increment LΔ (76), is reviewed. On these bases, the new control increment, Δ,(89) is generated from fuzzy rules or rule base 82 through fuzzy inference 85, 84 and defuzzification 86. The adjustable gains, G$_1$ (75) and G$_2$ (55), generated by scaling factors circuit 70, convert the input and control variables to normalized per unit (pu) values. This allows flexibility in the design and tuning of the controllers because a single fuzzy rule base can be used for all operating conditions. Additionally, the same controller can be applied to any turbine system by simply changing the input and output gain factors. Because all variables are represented on a per unit basis, the universe of discourse for the per unit variables is normalized in a [−1, 1] interval.

The rule base 82 for fuzzy controllers FLC-1 (54) and FLC-2 (56) is contained in Table 1 below.

TABLE 1

Rule Base 82 for Controller FLC-1.

| ΔPo\LΔW$_r$ | P | ZE | N |
|---|---|---|---|
| PVB | PVB | PVB | NVB |
| PB | PB | PVB | NB |
| PM | PM | PB | NM |
| PS | PS | PM | NS |
| ZE | ZE | ZE | ZE |
| NS | NS | NM | PS |
| NM | NM | NB | PM |
| NB | NB | NVB | PB |
| NVB | NVB | NVB | PVB |

The rule base 82 for fuzzy controller FLC-2 (56) is contained in Table 2 below.

TABLE 2

Rule Base 82 For Controller (FLC-2).

| ΔP$_o$\LΔi$_{ds}$ | N | P |
|---|---|---|
| PB | NB | PB |
| PM | NM | PM |
| PS | NS | PS |
| ZE | ZE | ZE |
| NS | PS | NS |
| NM | PM | NM |
| NB | PB | NB |

The rule base for fuzzy logic controller FLC-3 (58) is contained in table 3.

TABLE 3

Rule Base For Controller FLC-3 (58)

| E\CE | NVL | NL | NM | NS | ZE | PS | PM | PL | PVL |
|------|-----|-----|-----|-----|-----|-----|-----|-----|-----|
| NVB  |     |     |     |     | NVB | NB  | NM  | NS  | ZE  |
| NL   |     |     |     |     | NB  | NM  | NS  | ZE  | PS  |
| NM   |     |     |     | NB  | NM  | NS  | ZE  | PS  | PM  |
| NS   |     |     | NB  | NM  | NS  | ZE  | PS  | PM  | PB  |
| ZE   |     | NB  | NM  | NS  | ZE  | PS  | PM  | PB  |     |
| PS   | NB  | NM  | NS  | ZE  | PS  | PM  | PB  |     |     |
| PM   | NM  | NB  | ZE  | PS  | PM  | PB  |     |     |     |
| PL   | NS  | ZE  | PM  | PM  | PB  |     |     |     |     |
| PVB  | ZE  | PS  | PM  | PB  | PVB |     |     |     |     |

In tables 1-3 the fuzzy variables N, P, PVB, PB, PM, PS, ZE, NS, NM, NB, and NVB are defined by the linguistic variables negative, positive, positive very big, positive big, positive medium, positive small, zero, negative small, negative medium, negative big, and negative very big, respectively.

An example fuzzy rule from Table 1 can be written as:
If the power increment is positive medium (PM) AND the last (old) control increment is positive (P) THEN the new control increment (Δ) is positive medium (PM).

The basic operation is that, if the last (old) control action indicated an increase in output power, proceed searching in the same direction with the control magnitude somewhat proportional to the measured power change.

The fuzzy variables are plotted in FIGS. 6, 7 and 9 for FLC-1, FLC-2 and FLC-3, respectively and are identified on those figures as follows: negative (N) 302, positive (p) 304, positive very big (PVB) 306, positive big (PB) 308, positive medium (PM) 310, positive small (PS) 312, zero (ZE) 314, negative small (NS) 316, negative medium (NB) 318, negative big (NB) 324, and negative very big (NVB) 326.

Figure 6A:
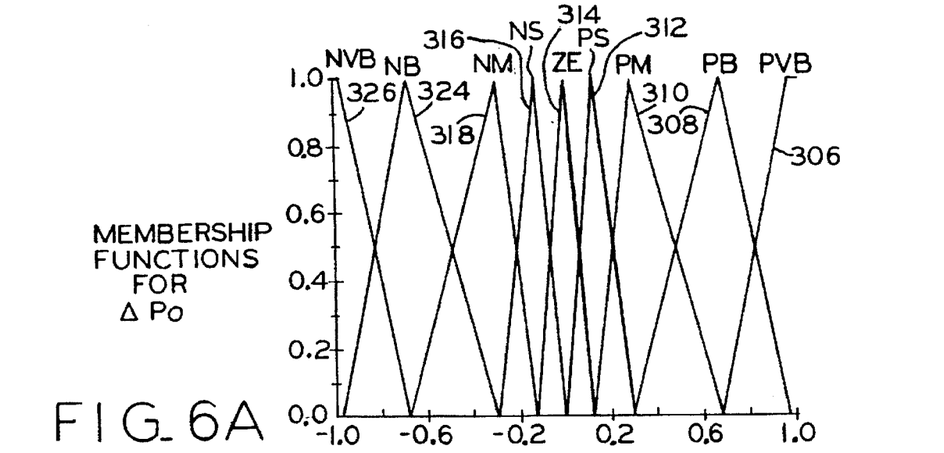
FIG. 6 illustrates membership functions for FLC-1 of FIG. 1.
Figure 6B:
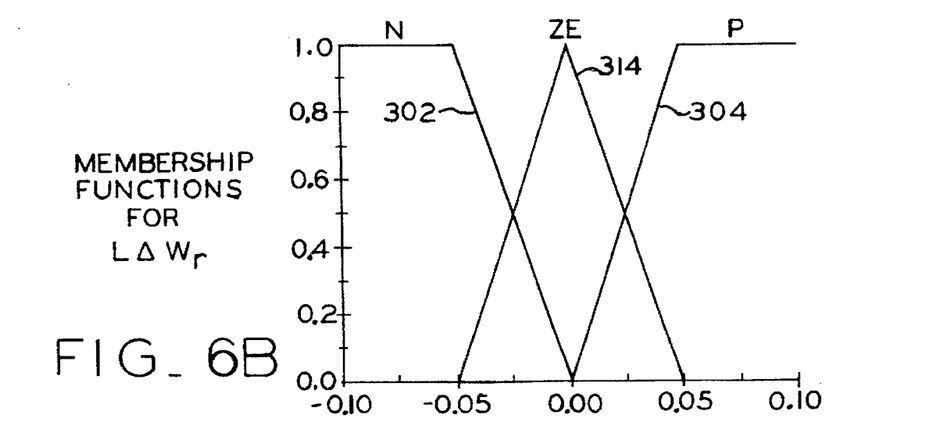
Figure 6C:
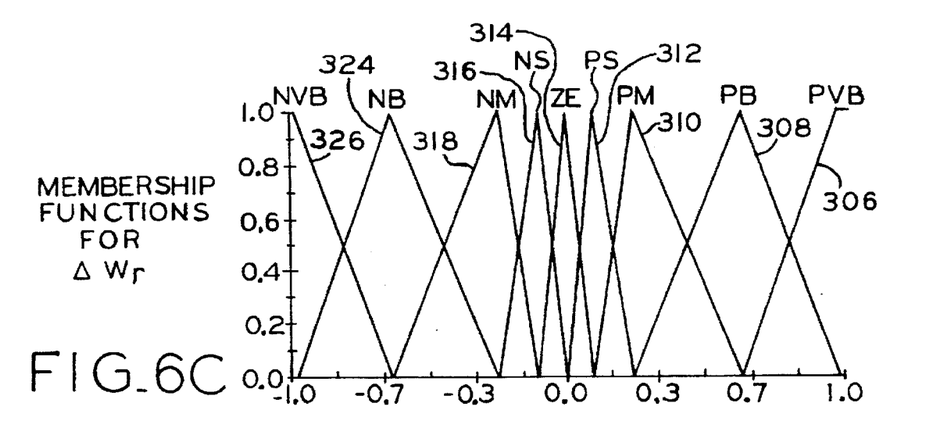
Figure 7A:
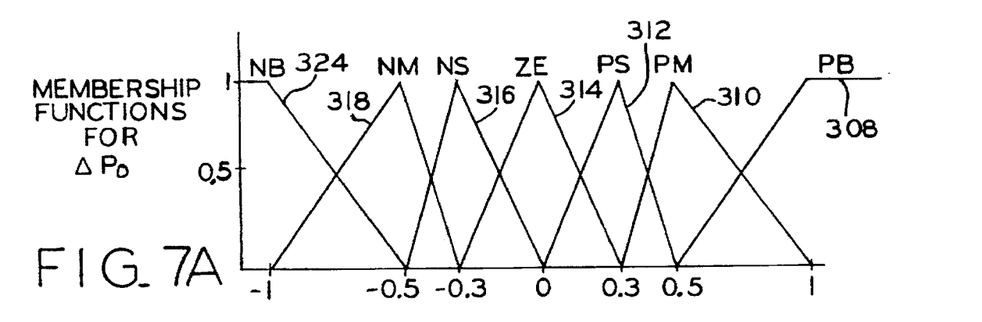
FIG. 7 illustrates membership functions for FLC-2 of FIG. 1.
Figure 7B:
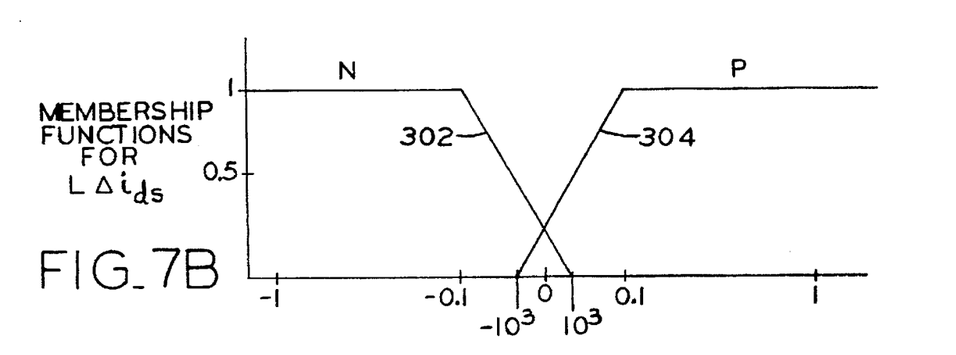
Figure 7C:
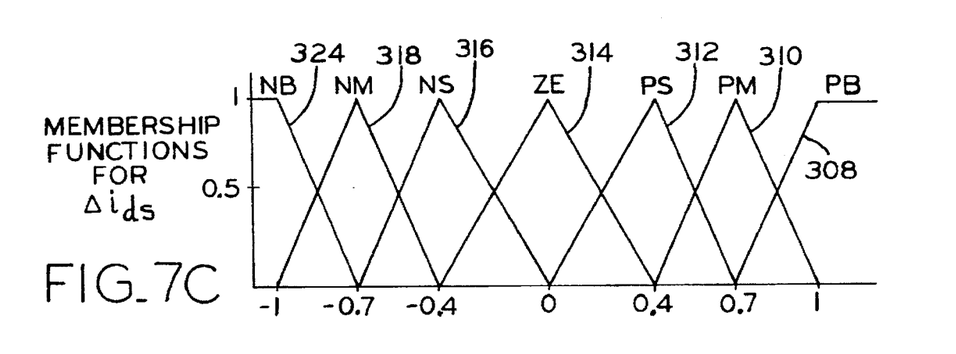

The fuzzification 85 of the control variables for FLC-1 and FLC-2 are defined by the triangular membership functions contained in FIGS. 6 and 7, respectively. A fuzzy set is characterized by a membership function that associates each element in the set to a number in the interval [0,1]. This number represents its grade of membership in the set. Fuzzy sets are viewed as the mathematical representation of linguistic values, e.g., negative (N), positive (P), positive very big (PVB), etc. These membership functions are normalized in the [−1, 1] interval, which in fuzzy logic set theory is defined as the universe of discourse. Placement of the triangles' peaks and each triangle's base length was determined by trial and error iteration in order to tune the controllers' performance and provide satisfactory control sensitivity and response. It was verified that typically 7 and 9 fuzzy sets were required for the power increment ($\Delta P_o T$) 78 and the new control increment (Δ) 89, while the past control increment (LΔ) 76 needed only 2 and or 3 fuzzy sets since the main information conveyed is the sign. A symmetrical distribution of positive and negative values around the median was maintained. The very small overlap around the origin of the positive (P) and negative (N) membership functions for the past control action associated with FLC-2 is required to prevent an indeterminate result in the case the past control action approaches zero.

A further discussion of membership functions is contained in "Designing With Fuzzy Logic", Kevin Self, 42 AM, IEEE Spectrum, Nov. 1990, hereby incorporated by reference. For the rule bases of Tables 1 and 2, the SUP-MIN composition method is used to generate a control signal. The output membership function of each rule is given by the MIN operator. The combined fuzzy output is given by the SUP operator. The defuzzification operation 86 can be performed by several methods of which the center-of-gravity (centroid) and height methods are the most common. Referring to FIG. 5, from the inferred value for Δ, 89 the next control signal 300 is determined according to:

$$U = LU + G_2 \Delta \ (pu)$$

where U represents the new control signal for either $w_r$ for FLC-1 or $I_{ds}$ for FLC-2, and LU represents the old signal.

Figure 8:
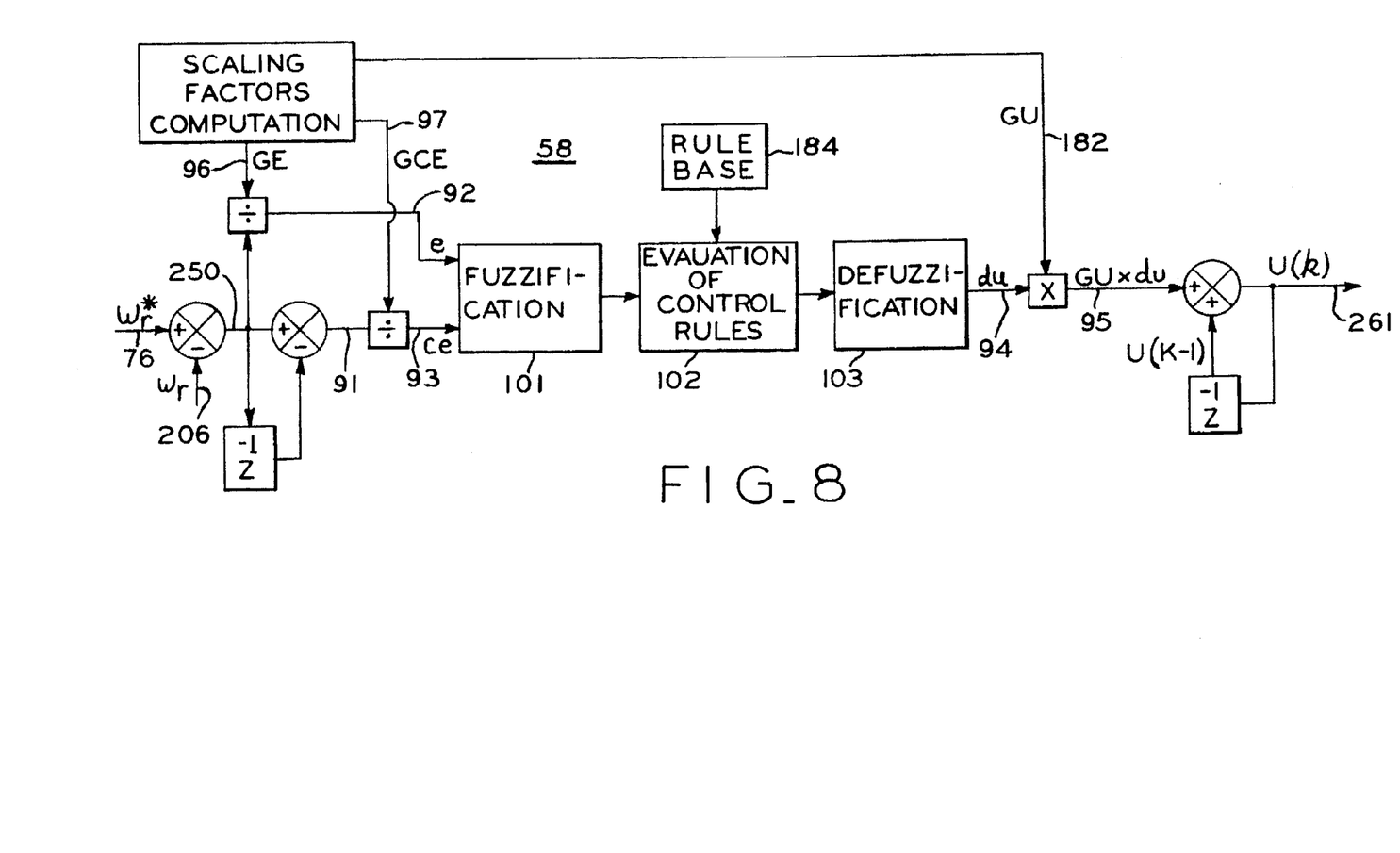
FIG. 8 shows details of the control block diagram for the fuzzy logic based adaptive speed loop controller (FLC-3).

FIG. 8 shows the basic structure of the fuzzy controller, FLC-3, for the speed control loop. Referring to FIG. 8, the input variables are:

$E(k) = w_r^*(k) - w_r(k)$ 250
$CE(k) = E(k) - E(k-1)$ 91 where
  $E(k)$ = speed loop error;
  $CE(k)$ = change in loop error;
  $w_r^*(k)$ = reference speed signal 76;
  $w_r(k)$ = speed signal 206; and
  k = sampling interval As with the other controllers, a fuzzy rule has the following structure:

IF E(k) is x AND CE(k) is y THEN DU(k) is z where DU is the change in control setting. The variables E(k) 250, CE(k) 91, and DU(k) 95 are further expressed in per unit values by dividing by appropriate gain factors GE 96, GCE 97, and Gu (182). The per unit quantities are defined by e(pu) 92, ce(pu) 93, and du(pu) 94. Based on intuition and experience, the following approach for the controller design are utilized:

1. If both e(pu) 92 and ce(pu) 93 are zero, then maintain the present control setting u(k) 261 with du(pu) 94=0.
2. If e(pu) 92 is not zero, but is approaching this value at a satisfactory rate, then maintain the present control setting u(k) 261.
3. If e(pu) 92 is getting larger, the change of the control signal du(pu) 94 depends on the magnitude and sign of e(pu) 92 and ce(pu) 93 signals.

Figure 9A:
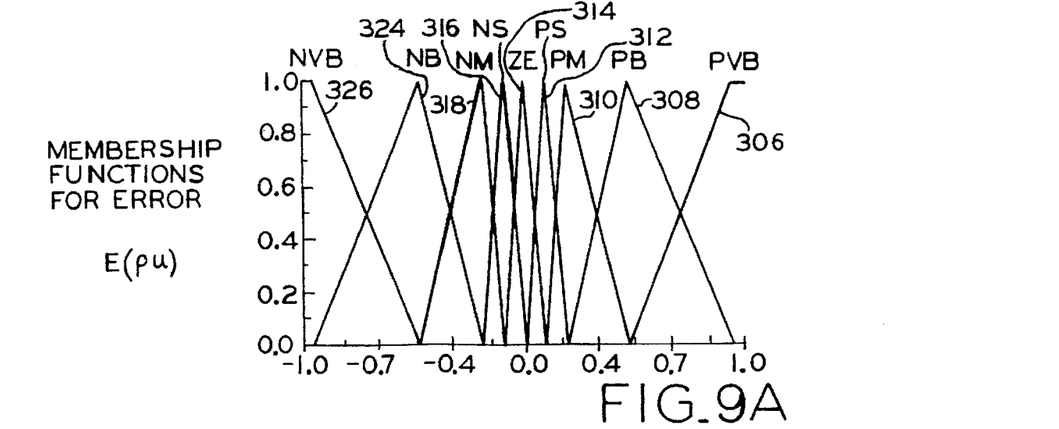
FIG. 9 illustrates membership functions of the FLC-3 fuzzy logic controller of FIG. 1.
Figure 9B:
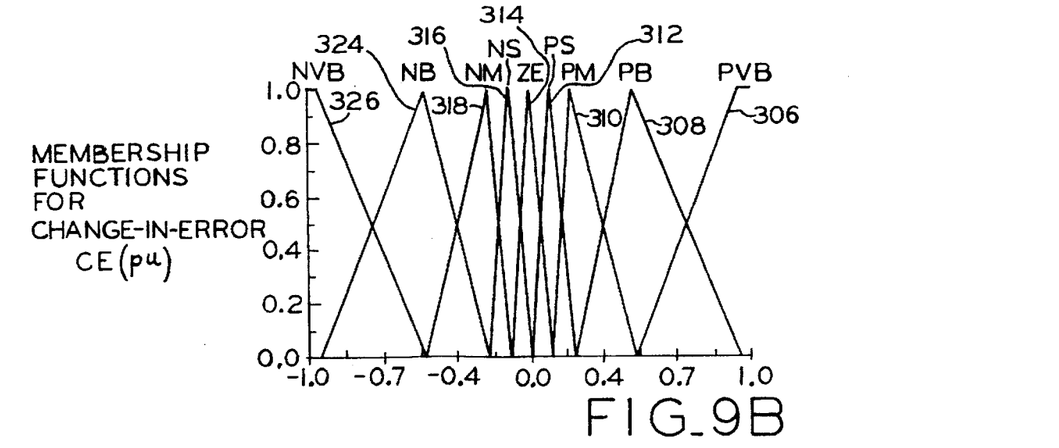
Figure 9C:
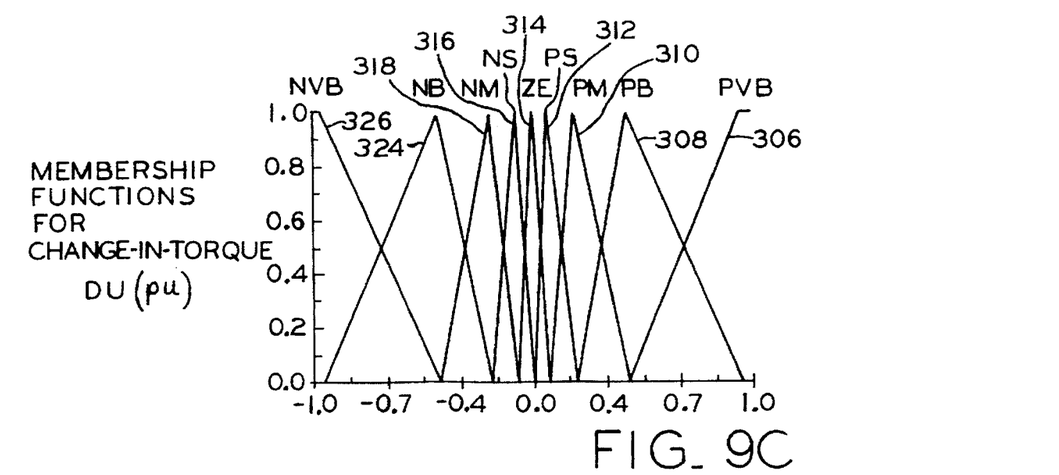

Fuzzification 101 of control variables e(pu), ce(pu), and du(pu) for the FLC-3 fuzzy logic controller 58 are defined by the triangular membership functions contained in FIG. 9. Previous explanative statements regarding membership functions in FLC-1 (54) and FLC-2 (56) fuzzy logic controllers apply. For this case, adequate control is achieved with 9 fuzzy sets for each control variable. The asymmetrical shape of the triangles allows more crowding of these functions near the origin, and consequently permits precise control while maintaining the minimum number of fuzzy sets for each variable at nine.

The rule base (184) matrix of Table 3 shows that the auxliar diagonal consists of ZE (zero) elements conform to the second consideration given above. The value assigned to du(pu) depends on the distance from the auxliar diagonal. Elements with no designation indicate no control action.

The steps for speed control provided by FLC-3 (58) are as follows:

1. Sample $w_r^*$(76) and $w_r$ (206).
2. Compute the error 92 e(pu) and change in error 93 ce(pu).
3. Identify the interval index for e(pu) and ce(pu) by the comparison method.
4. Compute the degree of membership of e(pu) and ce(pu) for the relevant fuzzy subsets.
5. Identify 102 the valid rules in Table 3 (above) and calculate the degree of membership using the MIN operator.

6. Use the SUP operator to determine the combined fuzzy output.
7. Use the centroid or height methods for defuzzification 103 to infer the control increment du(pu) 94.
8. Compute the next control signal 261 as U(k)=U(k−1) +GU×du(pu), where GU is the gain factor 82 and U represents the torque, $(T_e^*)$ control signal (261) of FIG. 1.

Similar operations are performed by fuzzy logic controllers 54 and 56 on their variables.

The fuzzy logic controller 54, 56 and 58 contain rule bases described in Tables 1, 2 and 3, respectively, consisting of several statements that have the following general structure: IF X is A and Y is B THEN z is C, where x, y, and z are fuzzy variables. For example, consider the airgap flux control system where a control rule may be expressed as: IF the change in output power (X) is positive big (A) and the last change in the flux component of stator current (y) is positive big (B) then the new change in the flux current (z) should be positive big (C). For a given rule base, fuzzy controller 200 computes a meaningful control action for a specific wind velocity input condition 22. A composition operation, such as the SUP-MIN method, allows fuzzy logic controller 200 to generate the required control action. Variables in the operating characteristics of wind turbine 1, electrical system, such as output power, line voltage, turbine1 speed, slip frequency, torque component of current, flux component of current, stator voltage, and stator current may be used as fuzzy logic control variables (input/output) making the control system independent of the mechanical configuration of the wind turbine1 system. Thus, the present invention may be applied to all vertical and horizontal axis wind turbines.

The efficiency improvement of a VSWT or the corresponding increase in power output 28 provided by the present invention is typically 15-20 percent. This is a composite power gain provided by optimizing both the turbine 1 and generator/converter systems 20 for maximum operating efficiency. The enhanced power output 28 is a function of wind velocity 22 or shaft 2 speed. Therefore, it can be expected that better performance will occur at lower wind velocities 22, since at shaft 2 speeds close to the rated generator speed, a lesser enhancement in generator efficiency can be achieved. This occurs because the generator is already operating at close to maximum efficiency.

Thus, the use of power electronics (converter 20 system) intelligently controlled by a microchip based fuzzy logic controllers 54,56 and 58 allows the speed of rotor 2 to vary with wind speed 22 while maintaining constant frequency (60 Hz) ac power output 28, while adjusting the turbine speed and generator 10 airgap magnetic flux for maximum output power. This allows the wind turbine 1 to operate at optimum efficiency over a wide range of wind speeds 22 thereby enhancing performance and power generation.

Accordingly, the present invention provides a significant increase in the electrical power generation of wind turbines by enhancing the operational efficiency. This in turn provides significant improvement of environmental quality through the reduction of emissions considered to be acid rain precursors and through the mitigation of a major greenhouse gas ($CO_2$). In addition, the present invention is extremely cost-effective such that the cost recovery period for the investment is relatively short.

While the present invention has been described with respect to certain preferred embodiments thereof, it is to be understood that numerous variations in the details of construction, the arrangement and combination of parts, and the type of materials used may be made without departing from the spirit and scope of the invention.

What we claim is:

1. An efficient wind turbine driven electric power generator fuzzy logic based control system to improve power efficiency of the generator comprising:

an induction operated generator including an air gap with magnetic flux;

a pulse width modulated control to vary an operating speed of said generator to maintain a substantially constant power frequency output from said generator;

fuzzy logic based controls to modify the operation of said pulse width modulated control to maximize the power output of said generator under variations of a wind driving said power generator;

the modification of said operation of said pulse width modulated control to maximize said power output including means to vary said airgap magnetic flux of said generator;

said generator being a squirrel cage induction generator; and said pulse width modulated control including solid state insulated gate bipolar transistor power electronic rectifier-inverter combination enabling power to flow in either direction to enable said generator to operate as a motor to provide start-up torque for said wind turbine generator.

2. The wind driven fuzzy logic based control system of claim 1 wherein said fuzzy logic control system further includes a fuzzy logic adaptive controller to adjust the speed of a variable speed generator for maximization of power output;

said adaptive controller operating on feedback signals derived from the electric power output of said electric power generator without the need for any wind velocity data.

3. The improved wind driven fuzzy logic based control system of claim 2 wherein said fuzzy logic control system includes at least one fuzzy logic controller which controls a flux component of current of said generator to control said air gap magnetic flux to reduce a power losses of said generator to further maximize the power output of said generator.

4. An efficient wind driven turbine driven electric power generator fuzzy logic based control system to improve power efficiency of the generator comprising:

an induction operated generator including an air gap with magnetic flux;

a pulse width modulated control operating to vary a speed of said generator to maintain a substantially constant power frequency output from said generator;

fuzzy logic based controls to modify the operation of said pulse width modulated control to maximize a power output of said generator under variations of a wind driving said power generator;

the modification of said operation of said pulse width modulated control to maximize said power output including means to vary said airgap magnetic flux of said generator;

wherein said control system further includes at least one solid state converter to control the speed of said generator to maintain said substantially constant power frequency;

said fuzzy logic control system further includes a fuzzy logic adaptive controller to adjust the speed of said variable speed generator for maximization of power output;

said fuzzy logic control system includes at least one fuzzy logic controller which controls a flux component of current of said generator to further maximize the power output of said generator;

said at least one solid converter includes a pulse width modulator and said fuzzy logic control system provides an input to said pulse width modulator; and wherein said fuzzy logic controller utilizes a fuzzy logic role base which is substantially:

| $\Delta P_o \backslash L\Delta$ | N | P |
|---|---|---|
| PB | NB | PB |
| PM | NM | PM |
| PS | NS | PS |
| ZE | ZE | ZE |
| NS | PS | NS |
| NM | PM | NM |
| NB | PB | NB | wherein:

$P_o$=power output of generator $L_\Delta$=last change

S=small

B=big

N=negative

P=positive

Z=zero.

5. The wind driven fuzzy logic control system of claim 4 wherein said generator is an induction generator which also operates as an induction motor when supplied with input power to provide starting torque to initiate rotation of said wind turbine.

6. An efficient integrated intelligent adaptive controller for a variable speed electric power generator including an air gap with magnetic flux driven by a variable power source comprising:

said generator being a squirrel cage induction motor;

power detection means to detect an electrical output power of said electrical power generator;

means including fuzzy logic control means to maintain a required speed of said electrical power generator for substantially constant power frequency output substantially independent of wind turbulence effects;

means to determine an optimum operation of said electrical power generator which will provide improved efficiency; and said fuzzy logic control means to vary said airgap magnetic flux of said electrical power generator in increments to modify said speed of said generator to further improve said efficiency;

said fuzzy logic control including a plurality of intelligent fuzzy logic controllers operating in response to signals derived from the power output of said electric power generator;

said fuzzy logic controllers providing a plurality of control signals;

one of said control signals varying a rotor speed of said generator to optimize a turbine aerodynamic efficiency for maximum power output; and another of said control signals reducing a magnetizing component of a stator current of said generator to optimize said generator air gap magnetic flux to minimize power losses of said generator.

7. The improved integrated fuzzy logic control of claim 6 wherein said variable power Source is wind and a wind turbine is provided to rotate said generator in response to said wind.

8. The integrated fuzzy logic control of claim 7 wherein said at least one fuzzy logic controller utilizes a rule base which is substantially:

| $\Delta P_o \backslash L\Delta$ | N | P |
|---|---|---|
| PB | NB | PB |
| PM | NM | PM |
| PS | NS | PS |
| ZE | ZE | ZE |
| NS | PS | NS |
| NM | PM | NM |
| NB | PB | NB |

Wherein:

$P_0$=power output of generator $L\Delta$=last change

S=small

M=medium

B=big

N=negative

P=positive

Z=zero.

9. The integrated fuzzy logic control of claim 8 wherein said generator is an induction generator which can also operate as an induction motor when supplied with input power to provide starting torque to initiate rotation of said round turbine.

10. The integrated fuzzy logic control of claim 9 wherein the output of said generator is connected to a power grid, and said input power is provided by said power grid when said induction generator operates as an induction motor.

11. An efficient integrated intelligent controller for a variable speed generator including an air gap with magnetic flux driven by a variable power source comprising;

power detection means to detect a electrical output of said electrical power generator;

means to maintain a required speed of said electrical power generator substantially independent of wind turbulence effects;

means including fuzzy logic control means to determine the optimum operation of said electrical power generator which will provide improved efficiency; and said fuzzy logic control means responsive to said power detection means to vary said airgap magnetic flux of said electrical power generator in increments to modify said speed of said generator to further improve said efficiency;

wherein said variable power source is wind and wind turbine is provided to rotate said generator in response to said wind;

said fuzzy logic control includes means to vary said airgap magnetic flux of said generator and at least one fuzzy logic controller to generate a flux control signal to vary said airgap flux;

said means to maintain the speed of said electrical power generator include solid state electronic converters; and said fuzzy logic control further includes a second fuzzy logic controller to provide a signal for adjusting said variable speed generator for maximum power.

12. The improved integrated fuzzy logic control of claim 11 wherein said fuzzy logic control further includes a third fuzzy logic controller to provide a fuzzy logic based adaptive speed loop controller to substantially eliminate wind turbulence effects and maintain substantially constant frequency of the output electric power provided by said generator.

13. The integrated fuzzy logic control of claim 12 wherein said solid state converters include at least one pulse width modulated inverter and at least one pulse width modulated rectifier.

14. The integrated fuzzy logic control of claim 13 wherein said solid state converters include at least one insulated gate bipolar transistor connected in parallel with a rectifier and forming a converter element.

15. The integrated fuzzy logic control of claim 14 wherein a plurality of said converter elements are connected in parallel to handle increased electric power.

16. The integrated fuzzy logic control of claim 15 wherein said inverter and said rectifier are connected by a DC link including at least on filter capacitor.

17. The integrated fuzzy logic control of claim 13 wherein a first pulse width modulated controller is provided to control the operation of said pulse width modulated inverter, and a second pulse width modulated controller is provided to control the operation of said pulse width modulated rectifier.

18. The integrated fuzzy logic control of claim 17 wherein each of the pulse width modulated controllers receives control signals provided by the fuzzy logic flux controller and from said fuzzy logic adaptive speed loop controller.

19. The integrated fuzzy logic control of claim 18 wherein said first pulse width modulated controller receives a control signed provided by the fuzzy logic power output controller.

20. The integrated fuzzy logic control of claim 11 wherein said at least one fuzzy logic controller utilizes a rule base which is substantially:

| $\Delta Po\backslash \Delta W_r$ | P   | ZE  | N   |
|---------|-----|-----|-----|
| PVB     | PVB | PVB | NVB |
| PB      | PB  | PVB | NB  |
| PM      | PM  | PB  | NM  |
| PS      | PS  | PM  | NS  |
| ZE      | ZE  | ZE  | ZE  |
| NS      | NS  | NM  | PS  |
| NM      | NM  | NB  | PM  |
| NB      | NB  | NVB | PB  |
| NVB     | NVB | NVB | PVB | wherein:

N is negative

P is positive

PVB is positive very big

PB is positive big

PM is positive medium

PS is positive small

ZE is zero

NS is negative small

NM is negative medium

NB is negative big

NVB is negative very big.

21. The improved integrated fuzzy logic control of claim 12 wherein said at least one fuzzy logic controller utilizes a rule base which is substantially:

| E\CE | NVL | NL  | NM  | NS  | ZE  | PS  | PM  | PL  | PVL |
|------|-----|-----|-----|-----|-----|-----|-----|-----|-----|
| NVL  |     |     |     |     | NVB | NB  | NM  | NS  | ZE  |
| NL   |     |     |     |     | NB  | NM  | NS  | ZE  | PS  |
| NM   |     |     |     | NB  | NM  | NS  | ZE  | PS  | PM  |
| NS   |     |     | NB  | NM  | NS  | ZE  | PS  | PM  | PB  |
| ZE   |     | NB  | NM  | NS  | ZE  | PS  | PM  | PB  |     |
| PS   | NB  | NM  | NS  | ZE  | PS  | PM  | PB  |     |     |
| PM   | NM  | NB  | ZE  | PS  | PM  | PB  |     |     |     |
| PL   | NS  | ZE  | PM  | PM  | PB  |     |     |     |     |
| PVL  | ZE  | PS  | PM  | PB  | PVB |     |     |     |     | wherein:

N is negative

P is positive

PVB is positive very big

PB is positive big

PM is positive medium

PS is positive small

ZE is zero

NS is negative small

NM is negative medium

NB is negative big

NVB is negative very big.

* * * * *